(12) United States Patent
Li et al.

(10) Patent No.: US 10,528,586 B2
(45) Date of Patent: Jan. 7, 2020

(54) DATABASE PROCESS WITH VIRTUAL NODES

(71) Applicant: International Business Machines Corporation, Armonk, NY (US)

(72) Inventors: Shuo Li, Beijing (CN); Xin Peng Liu, Beijing (CN); Xiaobo Wang, Beijing (CN); Chong Yuan Yin, Zhejiang (CN); Chen Xin Yu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 371 days.

(21) Appl. No.: 15/385,501

(22) Filed: Dec. 20, 2016

(65) Prior Publication Data

US 2018/0173773 A1    Jun. 21, 2018

(51) Int. Cl.
*G06F 16/00* (2019.01)
*G06F 16/25* (2019.01)
*G06F 16/2455* (2019.01)

(52) U.S. Cl.
CPC ...... *G06F 16/254* (2019.01); *G06F 16/24568* (2019.01)

(58) Field of Classification Search
CPC .................................................. G06F 16/254
USPC ......................................................... 707/602
See application file for complete search history.

(56) References Cited

U.S. PATENT DOCUMENTS

| | | | |
|---|---|---|---|
| 7,529,753 B1 | 5/2009 | Ewing | |
| 7,634,505 B2 | 12/2009 | Chasman et al. | |
| 8,307,177 B2 * | 11/2012 | Prahlad | G06F 11/1453 711/162 |
| 8,489,929 B2 | 7/2013 | Lam et al. | |
| 9,037,543 B2 * | 5/2015 | Zha | G06F 16/951 707/639 |
| 9,305,017 B2 | 4/2016 | Kimball et al. | |
| 2011/0083122 A1 | 4/2011 | Chen et al. | |
| 2015/0248422 A1 | 9/2015 | Zha et al. | |
| 2016/0217159 A1 | 7/2016 | Dahan et al. | |

(Continued)

OTHER PUBLICATIONS

Li, et al., "Database Process With Virtual Nodes", U.S. Appl. No. 15/815,229, filed Nov. 16, 2017.

(Continued)

*Primary Examiner* — Chelcie L Daye
(74) *Attorney, Agent, or Firm* — Cantor Colburn LLP; Richard Wilhelm (57) ABSTRACT

A database processing system includes a coordinator agent controller and a virtual node data base. The coordinator agent controller detects a request to access a database by an application program and to extracts database objects from a database protocol stream based on a requirement requested by the application program. The virtual node database is generated according to the extracted database objects. The virtual node database includes memory dump storage that stores the database objects extracted from the database protocol stream, and based on the database objects the virtual node database generates virtual database objects corresponding to the database protocol stream. The extraction of database objects is performed directly on the database protocol stream without communicating with a target real database.

11 Claims, 5 Drawing Sheets

(56) References Cited

U.S. PATENT DOCUMENTS

2016/0314046 A1* 10/2016 Kumarasamy ...... G06F 11/1435

OTHER PUBLICATIONS

List of IBM Patents or Patent Applications Treated as Related; Nov. 16, 2017, 2 pages.
Wayne Kemochan, "Software testing techniques to address distributed databases," TechTarget <https://searchdatacenter.techtarget.com/tip/Software-testing-techniques-to-address-distributed-databases> (9 pages).

* cited by examiner

DATABASE PROCESS WITH VIRTUAL NODES

BACKGROUND

The present disclosure relates generally to database systems, and more particularly, to multi-node database systems.

Database systems that implement multiple physical nodes are widely applied in the productive environment. When developing updated or new generation databases, developers may need to connect to the current operating database (thereby creating a new physical node) and/or may need to rewrite the interface to perform testing. However, the database may not be available to the developers. Rewriting the interface can also introduce errors into the database system. Therefore, one conventional solution is to build a duplicated physical database that is reserved solely for testing purposes. This solution, however, suffers from high costs and consumes additional storage resources.

SUMMARY

According to at least one non-limiting embodiment, a database processing system includes a coordinator agent controller and a virtual node data base. The coordinator agent controller detects a request to access a database by an application program and to extracts database objects from a database protocol stream based on a requirement requested by the application program. The virtual node database is generated according to the extracted database objects. The virtual node database includes memory dump storage that stores the database objects extracted from the database protocol stream, and based on the database objects the virtual node database generates virtual database objects corresponding to the database protocol stream. The extraction of database objects is performed directly on the database protocol stream without communicating with a target real database.

According to another non-limiting embodiment, a method of operating a virtual node in a database processing system comprises detecting, via a coordinator agent controller, a request to access a database by an application program, and extracting, via the coordinator agent controller, database objects from a database protocol stream based on a requirement requested by the application program. The method further includes generating a virtual node database according to the extracted database objects, storing the database objects extracted from the database protocol stream in a memory dump storage of the virtual node database, and generating, via the virtual node database, virtual database objects corresponding to the database protocol stream. The extraction of database objects is performed directly on the database protocol stream without communicating with a target real database.

According to yet another non-limiting embodiment, a computer program product operates a database processing system that includes a virtual node database. The computer program product comprises a computer readable storage medium having program instructions embodied therewith. The program instructions are executable by an electronic computer processor to control the database processing system to detect, via a coordinator agent controller, a request to access a database by an application program, and extract, via the coordinator agent controller, database objects from a database protocol stream based on a requirement requested by the application program. The computer processor further controls the database processing system to generate a virtual node database according to the extracted database objects, store the database objects extracted from the database protocol stream in a memory dump storage of the virtual node database, and generate, via the virtual node database, virtual database objects corresponding to the database protocol stream. The extraction of database objects is performed directly on the database protocol stream without communicating with a target real database.

DETAILED DESCRIPTION

Various non-limiting embodiments provide a database system including virtual nodes. The virtual nodes are generated at a network protocol layer. Each connection (i.e., connection desired by a client, a developer, or application program) to an operating database is treated as a virtual node. A standard protocol such as Distributed Relational Database Architecture (DRDA), for example, establishes communication (e.g., a protocol dataflow) between client, physical and virtual node databases. A stub for the database nodes is established by recording the dataflow. When clients (e.g., an application program) connect to the database nodes, a coordinator agent controller is configured to extract information (e.g., database objects) from the protocol dataflow (e.g., the DRDA flow), and output the information based on the remote database or from a memory dump. Based on the dataflow, the virtual node database extracts the return result set format. Depending on the information, a virtual node can obtain column information such as column type, unique key information, column constraints, etc., build up the return result set, and return the result set to the client.

Figure 1:
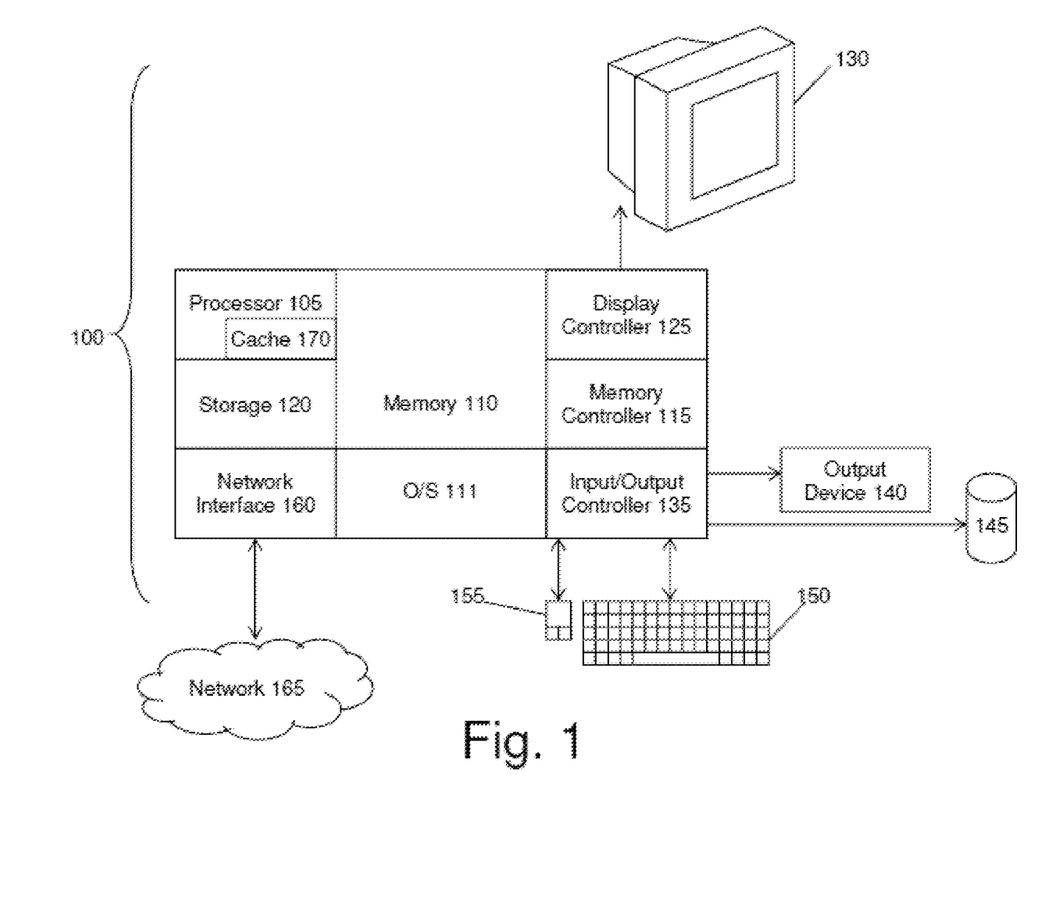
FIG. 1 illustrates a computer system configured to implement a database processing system with virtual nodes according to a non-limiting embodiment.

Turning now to FIG. 1, a computer system 100 configured to implement a database system including virtual nodes is illustrated according to a non-limiting embodiment. The data-loading systems and methods described herein may be implemented in hardware, software (e.g., firmware), or a combination thereof. In an exemplary embodiment, the methods described may be implemented, at least in part, in hardware and may be part of the microprocessor of a special or general-purpose computer system 100, such as a personal computer, workstation, minicomputer, or mainframe computer.

In an exemplary embodiment, as shown in FIG. 1, the computer system 100 includes a processor 105, memory 110 coupled to a memory controller 115, and one or more input devices 145 and/or output devices 140, such as peripherals, that are communicatively coupled via a local I/O controller 135. These devices 140 and 145 may include, for example, a printer, a scanner, a microphone, and the like. A conventional keyboard 150 and mouse 155 may be coupled to the I/O controller 135. The I/O controller 135 may be, for example, one or more buses or other wired or wireless connections, as are known in the art. The I/O controller 135 may have additional elements, which are omitted for simplicity, such as controllers, buffers (caches), drivers, repeaters, and receivers, to enable communications.

The I/O devices 140, 145 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 105, which may have one or more processing cores, is a hardware device for executing hardware instructions or software, particularly those stored in memory 110. The processor 105 may be any custom made or commercially available processor, a central processing unit (CPU), an auxiliary processor among several processors associated with the computer system 100, a semiconductor based microprocessor (in the form of a microchip or chip set), a macroprocessor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, etc.).

The memory 110 may include any one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially may control the execution of other computer programs and provides scheduling, input-output control, file and data management, memory management, and communication control and related services.

Additional data, including, for example, instructions for the processor 105 or other retrievable information, may be stored in storage 120, which may be a storage device such as a hard disk drive or solid state drive. The stored instructions in memory 110 or in storage 120 may include those enabling the processor to execute one or more aspects of the data-loading systems and methods of this disclosure.

The computer system 100 may further include a display controller 125 coupled to a display 130. In an exemplary embodiment, the computer system 100 may further include a network interface 160 for coupling to a network 165. The network 165 may be an IP-based network for communication between the computer system 100 and any external server, client and the like via a broadband connection. The network 165 transmits and receives data between the computer system 100 and external systems. In an exemplary embodiment, the network 165 may be a managed IP network administered by a service provider. The network 165 may be implemented in a wireless fashion, e.g., using wireless protocols and technologies, such as WiFi, WiMax, etc. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

Data-loading systems and methods according to this disclosure may be embodied, in whole or in part, in computer program products or in computer systems 100, such as that illustrated in FIG. 1.

Figure 2:
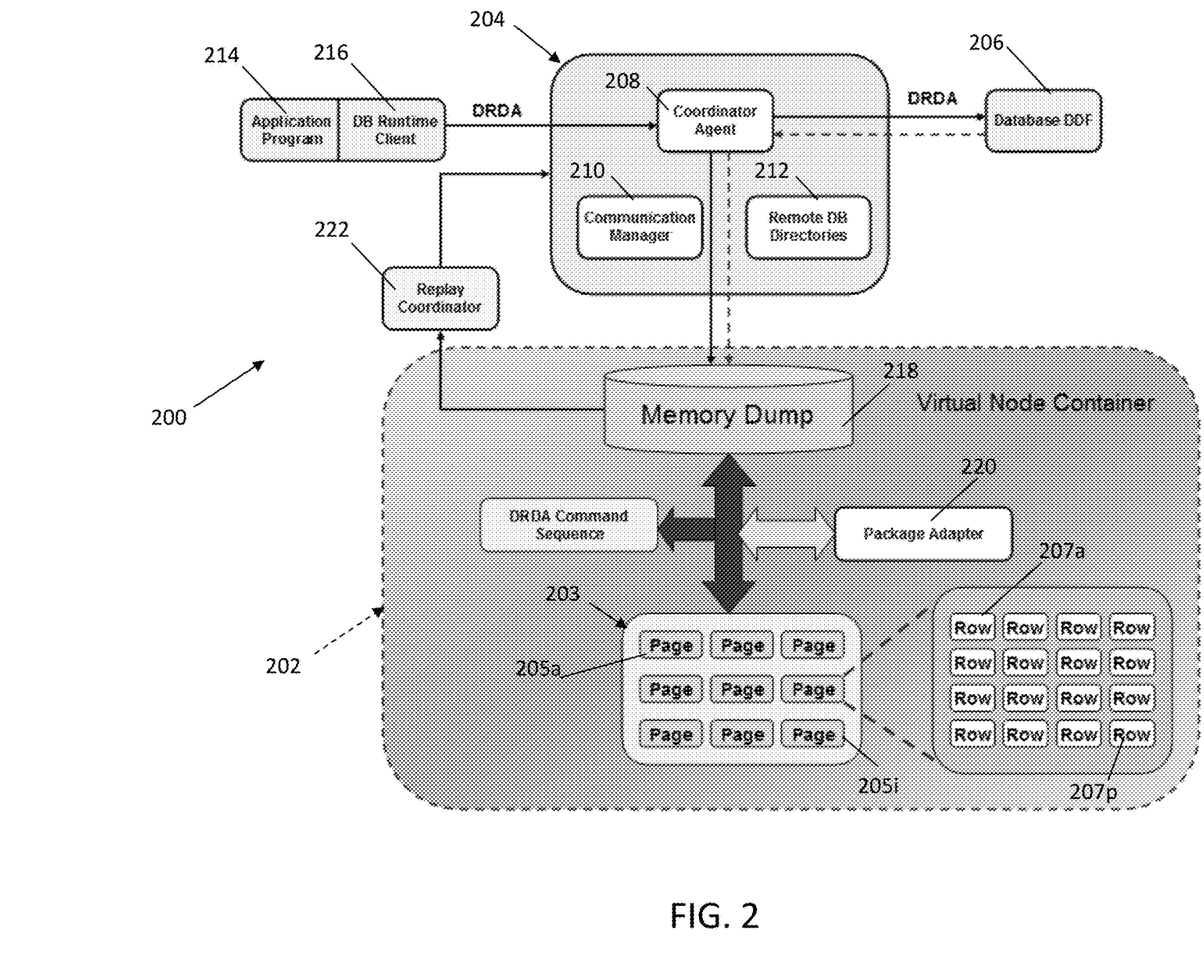
FIG. 2 depicts a database processing system with virtual nodes according to a non-limiting embodiment.

Referring to FIG. 2, a database processing system 200 implementing one or more virtual nodes 202 is illustrated according to a non-limiting embodiment. The database processing system 200 includes a coordinator agent controller 204 in signal communication with the virtual node database 202 and a current operating database 206.

The coordinator agent controller 204 includes a coordinator agent engine 208, a communication manager engine 210, and one or more remote database directories 212. The coordinator agent engine 208 receives a request from a client 214 such as an application program 214, for example, and establishes a Database Definition File (DDF) request to be sent to current operating database 206. In at least one embodiment, the coordinator agent controller 204 can be configured as a protocol interceptor such as, for example, a TCP/IP forwarder or proxy, when the TCP/IP is used as the base protocol to transmit client requests to a remote database system. In this manner, the coordinator agent controller 204 can accept client requests (e.g., request from the application program 214) and then pass the requests to a real operating database 206 and/or the virtual node database 202.

The application program 214 sends a request bearing DDF which are facilitated according to the currently implemented database protocol such as, for example, a DRDA protocol. However, it should be appreciated that other database protocols may be implemented. The DRDA protocol may implement various architectures for building the database. For example, the DRDA protocol may implement a Distributed Data Management (DDM) architecture, a Formatted Data Object Content Architecture (FD:OCA), and a Character Data Representation Architecture (CDRA). The database protocol provides the command and reply structure used by the distributed databases. The FD:OCA provides the data definition architectural base for DRDA. The CDRA provides the consistency of character data across the multiple platforms.

In at least one embodiment, a database runtime client 216 is provided to operate the application program 214 on remote databases. Capabilities of the runtime client 216 include, but are not limited to, controlling the functionality from a data server driver, controlling the command line processor (CLP) for issuing commands, providing a basic way to remotely administer servers, controlling replicating scripting programs such as, for example, an Autonomous System Number Command Line Processor (ASNCLP) program to set up and administer all replication programs for Q replication and SQL replication, providing support for common network communication protocols (e.g., TCP/IP, Named Pipe, etc.), and generating a catalog that stores information for connecting to databases and servers.

When the application program 214 attempts to access a database, several processes or threads begin to perform the various application tasks. These tasks include logging, communication, and prefetching. The tasks can be managed using Structured Query Language (SQL), for example. The coordinator agent engine 208 can generate threads that are used to service application requests. The maximum number of application connections is controlled by the communication manager engine 210.

In at least one embodiment, each database 206 realizing a connection initiated by an application program 214 is in signal communication with the coordinator agent engine 208 which coordinates its work on the database 206. After the coordinator agent engine 208 is created, it performs all database requests on behalf of a corresponding application program 214, and communicates with other agents using interprocess communication (IPC) or remote communication protocols. In at least one embodiment, a coordinator agent engine 208 can be created for each connected application program 214. Accordingly, each coordinator agent engine 208 can operate with its own private memory and shares database manager and database global resources, such as the buffer pool, with other agents. When a transaction completes, an active coordinator agent engine 208 might become an inactive agent.

When a client 214 (e.g., application program 214) disconnects from a database or detaches from an instance, its corresponding coordinator agent engine 208 will be: (a) an active coordinator agent if other connections are waiting; (b) freed and marked as idle if no connections are waiting, and the maximum number of pool agents is being automatically managed or has not been reached; or (c) terminated and its storage freed if no connections are waiting, and the maximum number of pool agents has been reached.

The coordinator agent engine 208 can also distribute database requests to subagents (not shown), which perform the requests for the application program 214. After the coordinator agent engine 208 is created, it handles all database requests on behalf of the corresponding application program 214 by coordinating the subagents that perform requests against the database. The subagents can also exist in nonpartitioned environments and in environments where intraquery parallelism is not enabled.

In at least one embodiment, coordinator agent engines 208 that are not performing work for any application programs and that are waiting to be assigned are considered to be idle agents and reside in an agent pool. These agents are available for requests from coordinator agent engines 208 operating on behalf of application programs 214, or for subagents operating on behalf of existing coordinator agent engines 208. The number of available agents depends on the value of the num_poolagents database manager configuration parameter. If no idle agents exist when an agent is required, a new agent is created dynamically. Because creating a new agent requires a certain amount of overhead, CONNECT and ATTACH performance is better if an idle agent can be activated for a client.

When a subagent is performing work for an application program 214, it is associated with that application program 214. After it completes the assigned work, it can be placed in the agent pool, but it remains associated with the original application program 214. When the application program 214 requests additional work or tasks, the communication manager first checks the idle pool for previously associated agents before it creates a new coordinator agent engine 208.

The virtual node database 202 includes a memory dump storage 218 and a package adapter 220. The virtual node 202 is composed of recorded database objects extracted from the database protocol stream by the coordinator agent controller 204. Unlike conventional real databases which organize database objects in a regular relational database, the virtual node database 202 organizes the extracted database blocks the memory dump storage 218 or with metadata to denote the structure of the virtual node database 202. Although a single memory dump storage 218 is illustrated, the virtual node database 202 is not limited thereto.

When the client 214 (e.g., application program 214) attempts to connect to a database node 206, the coordinator agent engine 208 responds to various requirements provided by the application program 214. In at least one embodiment, the coordinator agent engine 208 is configured to send the information depending on the database 206 or from the memory dump storage 218. In at least one embodiment, data in the memory dump storage 218 is used to define the page arrangement 203 of the virtual node 202. For instance, the page arrangement 203 may include an array of pages 205a-205i of a fixed size (e.g., 8 kB, although a different page size can be selected). Each page 205a-205i is logically equivalent, so a particular item 207a-207p (e.g., row 207a-207p) can be stored in any page 205a-205i. In addition, structures of the virtual node 202 can be defined according to a Data Definition Language (DDL). For instance, DDL statements create, modify, and remove database objects such as tables, indexes, and users. A replay coordinator controller 222 is connected between memory dump storage 218 and the coordinator agent controller 204. In this manner, activity in the virtual node 202 can be captured, replayed, and returned to the coordinator controller. The replayed data can be replayed at the current operating database 206 or in a different database (not shown).

In addition, unlike the coordinator agent engine 208—which is responsible for intercepting the database protocol flow, and extracting data (e.g., database objects) from the row package—the replay coordinator controller 222 obtains the extracted data and is responsible for data comprehension and sequence maintenance. For instance, the replay coordinator controller 222 can record both the extracted data from the DRDA package as well as the saved data transmission sequence within the memory dump. In another operation, the replay coordinator controller 222 can organize, distil, and extract data that are formerly recorded and stored in the memory dump storage 218 and generate the data package according to the formerly recorded sequence.

In at least one embodiment, the replay operation provided by the replay coordinator controller 222 includes memorizing both the data content and sequence, both which are then relayed to the client 214 (e.g., application program 214) in a similar (i.e., virtualized) manner as performed by a real database, and relaying the data content and sequence to the coordinator agent controller 204.

In at least one non-limiting embodiment, a mutation or variation may exist based on the test equipment and rooted from recorded data in the initial process. For instance, when the virtualized database protocol stream is returned to the client 214 (e.g., application program 214), one or more fake database objects (i.e., pseudo database objects) can be generated. Fake database objects are described herein as database objects that are issued by the virtual data node according to one or more non-limiting embodiments of the invention described herein, as opposed to objects generated by a real or actual physical database system. These fake database objects can then be directly merged into the protocol stream, which is relayed back to the client. In addition, the fake database objects can be mutated and serialized on-the-fly (i.e., in real-time) from the virtual node database 202 and returned to the protocol stream without setting up any extra database system as protocol issuers. The virtual node database 202 can mutate according to different requests from the client 214. The different requests include, but are not limited to, a request to self-copy to duplicate and mimic data from multiple databases, a request to self-copy or randomize rows of data in one table object to mimic data of different volumes, and a request to add or remove columns of one table object to mimic data from different table versions. By mutating the protocol stream, a response from one or more databases we can easily be mimicked. Traditional real databases, however, would require setting many actual or real database systems to produce such reply.

Figure 3:
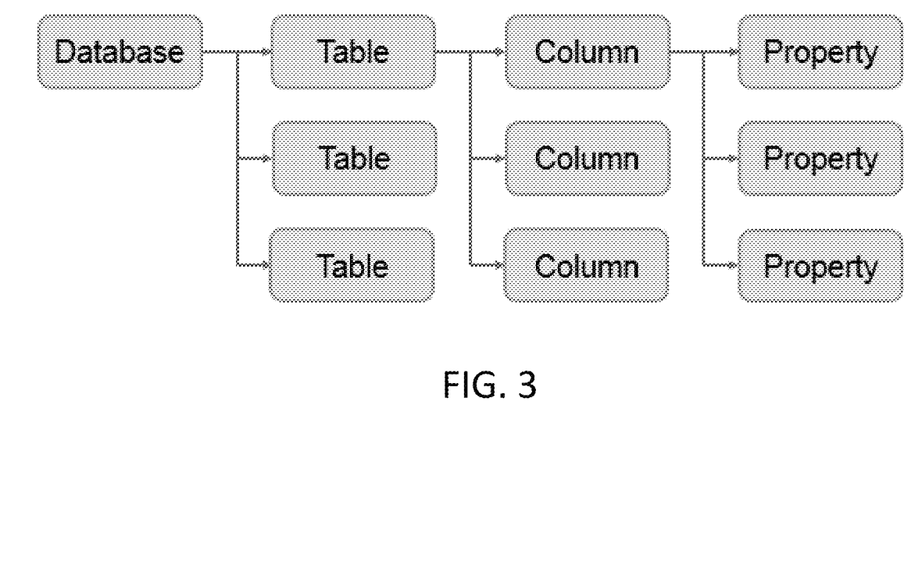
FIG. 3 illustrates a tree map indicating data type generated by a virtual node corresponding to a data definition language (DDL) according to a non-limiting embodiment.

The coordinator agent engine 208 can pass the dataflow to the virtual node 202, and the package adapter 220 can exact the dataflow by the DRDA command sequence and the data information. SQLs within the DRDA, for example, are identified and analyzed. In at least one embodiment, the coordinator agent engine 208 extracts the return result set format from the dataflow. For example, the information about the database 206 can be obtained directly from the database 206, or can be extracted from the DDL. With the DDL, the virtual node 202 can be generated and the extracted information can be organized as a tree map with the data type (see FIG. 3), and saved in memory dump storage 218. Depending on the information, the virtual node 202 may obtain column information such as, for example, as column type, unique key information, column constraints, etc., and then build up the return result set. The return result set can be built according to defined parameters or can be built randomly. In an embodiment, the virtual node 202 builds up the result set based on the column information and parsed queries.

The coordinator agent engine 208 can also request the potential data flow actively in advance. In this manner, the coordinator agent engine 208 can communicate with a client 214 directly without a real database connection. The package adapter 220 can also package the data information and generate the DRDA commands together. The data generated can also be virtual data. For instance, the data can be generated depending on the recorded information as the seeds or the data could be generated by predetermined rules or can be generated randomly.

Figure 4:
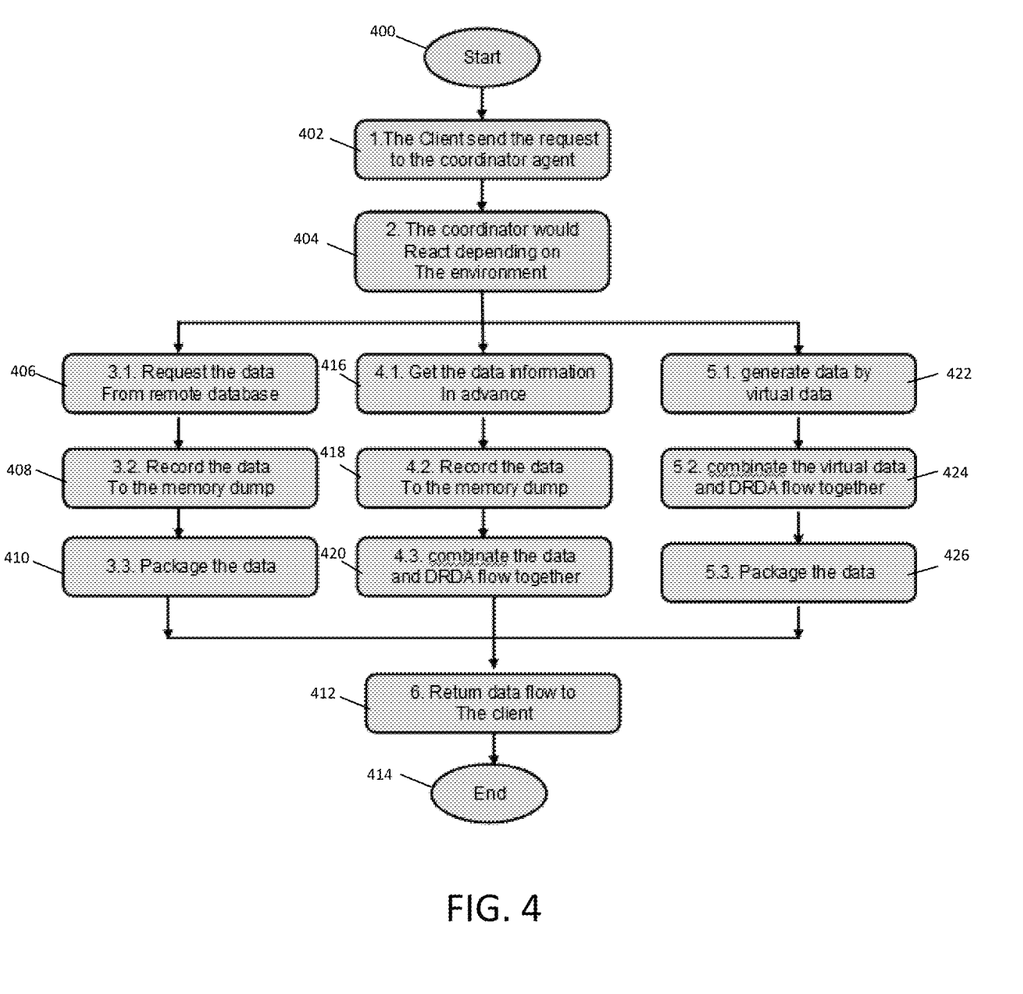
FIG. 4 is a flow diagram illustrating a method of operating a database processing system with virtual nodes according to a non-limiting embodiment.

Referring now to FIG. 4, a flow diagram illustrates a database processing system operating with virtual nodes according to a non-limiting embodiment. The method begins at operation 400, and at operation 402 a client (e.g., application program) sends a request to a coordinator agent controller in an attempt to connect to a current operating database. In at least one embodiment, the request is generated according to DRDA. At operation 404, the coordinator agent controller responds to the client based on the environment. For instance, the coordinate agent controller can redirect data flow depending on various different environment conditions. The environment conditions include, but are not limited to, a working mode such as a normal mode or test mode, rules controlling the use of a remote database or local memory dump, network usage ratio, etc.

The coordinator agent controller can obtain the data in various different manners. For example, at operation 406 the coordinator agent controller requests the data from a remote database. If the coordinator agent controller selects to use remote database data flow to obtain the data from the remote database, the coordinator agent controller can be configured as a channel to directly pass the data flow. Upon obtaining the data under this scenario, the coordinator agent controller records the data to the memory dump storage at operation 408. In at least one embodiment, the coordinator agent controller records the data flow for the stubs usage in the future. At operation 410, the data delivered to the memory dump storage is packaged via a package adapter associated with a corresponding virtual node such that the coordinator agent controller can then return the data flow from the database. At operation 412, the coordinator agent controller returns the data flow to the client (e.g., application program), and the operation ends at operation 414.

The coordinator agent controller can also obtain data information in advance at operation 416. For example, the coordinator agent controller can record some data flow in advance. The recorded data can be obtained from the data flow applied before, or the coordinate agent controller requests the data flow actively in advance. That is, even if the client never issues a second request, the coordinator agent controller can predict and issue a request that might be issued by a client in next call based on common data interaction pattern between a client and the remote database server, or based on interaction history. At operation 418, the data is recorded to the memory dump storage. In at least one embodiment, when the coordinator agent controller obtains the data flow, the memory dump could be saved directly to the memory dump storage, or extracted as DRDA commands and dataflow information. At operation 420, the data is combined with the DRDA flow. For instance, when the data flow is requested, the coordinator agent controller returns the data flow directly or combines the data and DRDA flow together. At operation 412, the coordinator agent controller returns the data flow to the client (e.g., application program), and the operation ends at operation 414.

The coordinator agent controller can also obtain data based on virtual data at operation 422. For instance, the coordinator agent controller generates the data flow based on the recorded information. In at least one embodiment, the data is generated by predetermined rules or is generated randomly. At operation 424, the virtual data is combined with the DRDA flow. At operation 426, the combined virtual data and DRDA flow is packaged according to a requested format via a package adapter associated with a corresponding virtual node. That is, data virtualization is performed by directly merging fake data (i.e., pseudo data blocks or virtual data blocks) into the protocol stream which can be relayed back to the client. At operation 412, the coordinator agent controller returns the data flow to the client (e.g., application program), and the operation ends at operation 414. In this manner, the database action flow is simulated such that an actual is not necessary in order to handle the real database requirement.

In either scenario described above, recorded packages may be an interaction between a client to a real database (which defines a real existing database), or, may be an interaction between a client with a virtual node, where the database names within the package is some self-mocked database (i.e., fake databases). Accordingly, a TCP intercept operation can be performed to record the protocol packages exchanged between client and server side database nodes, and determine whether the database referenced within the package is a real database (even in a cloud environment the clients are allowed to check database) or a fake database. The TCP intercept operation typically involves intercepting and validating TCP connection requests. In intercept mode, the TCP intercept software intercepts TCP synchronization (SYN) packets from clients to servers that match an extended access list. The software establishes a connection with the client on behalf of the destination server, and if successful, establishes the connection with the server on behalf of the client and knits the two half-connections together transparently. Traffic can be monitored from a certain address or network, to a certain address or network, or both. In this manner, the database processing system that includes virtualized nodes according to the various non-limiting embodiments described herein can be detected.

Figure 5:
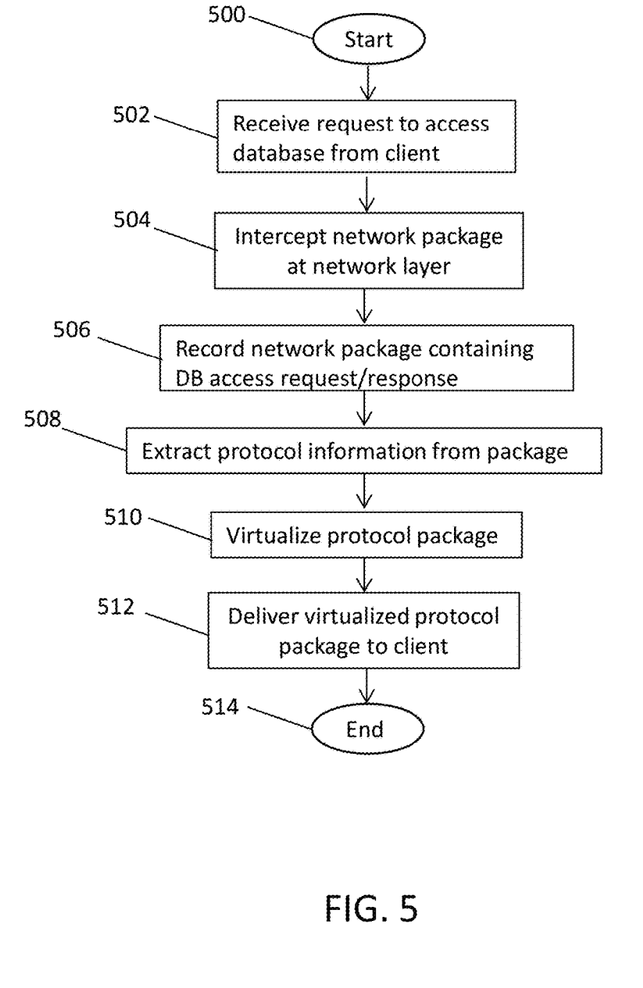
FIG. 5 is a flow diagram illustrating a method of generating a virtual node at a network protocol layer according to a non-limiting embodiment.

Referring to FIG. 5, a flow diagram illustrates a method of generating a virtual node at a network protocol layer. The method begins at operation 500, and at operation 502, a client (e.g., application program) generates a request to access a database. At operation 504, a database protocol package containing a database access request/response (e.g., a DRDA package) is intercepted at a network layer. At operation 506, the network package is recorded (e.g., stored in a memory location). At operation 508, protocol information is extracted from the recorded network package. For example, SQLs within the DRDA are identified and analyzed. At operation 510, the protocol package is virtualized. In at least one embodiment, the protocol package virtualization process includes filling the response network package with virtualized content. That is, the data virtualization is performed at a protocol level by directly merging fake data (i.e., pseudo data blocks or virtual data blocks) into the protocol stream, which is relayed back to the client. At operation 512, the virtualized protocol package is delivered to the client, and the method ends at operation 514. In at least one embodiment, the client (e.g., application program) can still send the network package when performing the protocol package virtualization, but the network package will be intercepted at the network layer. The completed virtualized network package will then be returned directly to the client. Accordingly, the client program does not need to be injected by any agent. In addition, the client program can perform profound testing because it can still communicate with the database network APIs instead of being virtualized at the client side to call a virtual data model.

Accordingly, various non-limiting embodiments described herein provide a processing system that implements virtual nodes. Based on information obtained by the coordinator agent controller, a database block (e.g., a DRDA block) is built as a virtual node. In this manner, multiple database connections can be stimulated by the database connection/DDL execution/data set generation without requiring a physical connection to the current operating database. This reduces costs, while also freeing up resources previously used to create a duplicate testing database. In addition, interface testing can be performed without the possibility of introducing errors into the current operating database system.

The database process system implementing virtual nodes also allows for scaling in/out at only the message level so as to allow for testing a cluster-base cell. In this manner, the virtual node can duplicate the data flow of a real database node while still allowing the client (e.g., application program) to send database connection protocol flow to a self-mocked database (i.e., a fake database) names or ports generated by the virtual node.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting-data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the term "module" refers to an application specific integrated circuit (ASIC), an electronic circuit, an electronic computer processor (shared, dedicated, or group) and memory that executes one or more software or firmware programs, a combinational logic circuit, and/or other suitable components that provide the described functionality. When implemented in software, a module can be embodied in memory as a non-transitory machine-readable storage medium readable by a processing circuit and storing instructions for execution by the processing circuit for performing a method.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A database processing system, comprising:
a coordinator agent controller configured to detect a request to access a database by an application program and to extract database objects from a database protocol stream based on a requirement requested by the application program; and
a virtual node database generated according to the extracted database objects, the virtual node database including a memory dump storage that stores the database objects extracted from the database protocol stream, and based on the database objects the virtual node database generates virtual database objects corresponding to the database protocol stream,
wherein the extraction of database objects is performed directly on the database protocol stream without communicating with a target real database,
wherein the memory dump storage stores the extracted database objects along with metadata to denote a structure of the virtual node database.

2. The database processing system of claim 1, wherein the virtual node database identifies the database protocol stream as at least one of connection information, query information, disconnection information.

3. The database processing system of claim 2, wherein the database objects are obtained according to a process including at least one of obtaining the database objects directly from a current operating database, and extracting the database objects according to a data definition language (DDL) of the database protocol stream.

4. The database processing system of claim 1, wherein the meta data comprises column information, the column information including at least one of column type, unique key information, and column constraints, and wherein the virtual node database is generated according to the column information and is defined by a result set.

5. The database processing system of claim 4, wherein the result set is at least one of a return result generated by a memory dump of the current operating database, a simulated result set based on a known result set, or a generated result set based on random depending of the database objects.

6. The database processing system of claim 1, further comprising a replay coordinator controller that relays a virtualized database protocol from the virtual node database, wherein when returning the virtualized database protocol stream, fake database objects are generated, mutated and serialized in real-time without setting up any extra database systems as protocol issuers.

7. A computer program product to operate a database processing system including a virtual node database, the computer program product comprising a computer readable storage medium having program instructions embodied therewith, the program instructions executable by an electronic computer processor to control the database processing system to perform:
detecting, via a coordinator agent controller, a request to access a database by an application program;

extracting, via the coordinator agent controller, database objects from a database protocol stream based on a requirement requested by the application program; and generating a virtual node database according to the extracted database objects;

storing the database objects extracted from the database protocol stream in a memory dump storage of the virtual node database; and generating, via the virtual node database, virtual database objects corresponding to the database protocol stream, wherein the extraction of database objects is performed directly on the database protocol stream without communicating with a target real database, storing, in the memory dump storage, the extracted database objects along with metadata to denote a structure of the virtual node database.

8. The computer program product of claim 7, further comprising identifying, via the virtual node database, the database protocol stream as at least one of connection information, query information, disconnection information.

9. The computer program product of claim 7, further comprising obtaining the database objects according to a process including at least one of obtaining the database objects directly from a current operating database, and extracting the database objects according to a data definition language (DDL) of the database protocol stream.

10. The computer program product of claim 7, wherein the meta data comprises column information, the column information including at least one of column type, unique key information, and column constraints, and wherein the virtual node database is generated according to the column information and is defined by a result set.

11. The computer program product of claim 7, further comprising relaying, via a replay coordinator controller, that relays a virtualized database protocol from the virtual node database, wherein when returning the virtualized database protocol stream, fake database objects are generated, mutated and serialized in real-time without setting up any extra database systems as protocol issuers.

* * * * *